United States Patent [19]

Prestwood et al.

[11] Patent Number: 5,242,032
[45] Date of Patent: Sep. 7, 1993

[54] MOBILE OIL CHANGE CART

[75] Inventors: Ronald D. Prestwood, Mocksville; Jill B. Crews, East Bend; Thomas E. Loyd, Sr., Winston-Salem, all of N.C.

[73] Assignee: Sara Lee Corporation, Winston-Salem, N.C.

[21] Appl. No.: 901,938

[22] Filed: Jun. 18, 1992

[51] Int. Cl.$^5$ .............................................. F16N 33/00
[52] U.S. Cl. ................................. 184/1.5; 184/105.1; 184/106; 312/228
[58] Field of Search ................. 112/256; 184/1.5, 106, 184/105.1; 141/98, 231, 382; 312/228, 229; 220/573; 123/196 R; D32/55, 56, 57; D23/286

[56] References Cited

U.S. PATENT DOCUMENTS

| D. 194,862 | 3/1963 | Kraines | D32/56 |
|---|---|---|---|
| 2,552,749 | 6/1951 | Tabet | 184/1.5 |
| 2,603,312 | 7/1952 | Tabet | 184/1.5 |
| 2,661,869 | 12/1953 | Simpson | 184/1.5 |
| 3,489,245 | 1/1970 | Broadwell | 184/1.5 |
| 3,575,481 | 4/1971 | Phlieger, Jr. | 312/228 |
| 5,016,689 | 1/1991 | McGarvey et al. | 141/198 |
| 5,062,500 | 11/1991 | Miller et al. | 184/1.5 |
| 5,082,034 | 4/1992 | Soper | 141/88 |

FOREIGN PATENT DOCUMENTS

| 2231100 | 1/1974 | Fed. Rep. of Germany | 184/1.5 |
|---|---|---|---|
| 2352162 | 12/1977 | France | 184/1.5 |

Primary Examiner—Ira S. Lazarus
Assistant Examiner—Alan B. Cariaso
Attorney, Agent, or Firm—Rhodes, Coats and Bennett

[57] ABSTRACT

A mobile oil change cart for a sewing machine or the like. The cart has a generally rectangular parallelepiped shape whose upper surface defines a work surface for supporting the sewing machine. The upper work surface includes a rubber mat on which the machine can be placed and which prevents the machine from sliding about. Adjacent to the rubber mat is a recessed sink for containing fluids which may be spilled from the sewing machine during maintenance. A rack across the surface of the sink supports the sewing machine while draining the oil from the machine. Wheels mounted to the lower surface of the cart permit it to be easily moved from one work station to another. Underneath the work surface is a tank compartment for receiving and storing both fresh and waste oil. In addition, the tank compartment also includes pump means for both delivering fresh oil to the sewing machine and retrieving waste oil from the sewing machine. A second storage compartment located at the other end of the cart provides for storage of oil filters and the like for use during maintenance.

12 Claims, 2 Drawing Sheets

MOBILE OIL CHANGE CART

BACKGROUND OF THE INVENTION

1. Field of the Invention

The present invention relates generally to containment of waste oil and other fluids and, more particularly, to a mobile oil change cart for supplying oil to and storing waste oil from sewing machines or the like.

2. Description of the Prior Art

The modern industrial sewing machine is an expensive and sophisticated device. Improper or infrequent maintenance can lead to early failure and expensive downtime. Moreover, there has been no means for easily and rapidly servicing such machines. Rather the current practice has involved removing the machine from service, taking it to a shop, performing the maintenance, and returning the machine to service.

U.S. Pat. No. 2,552,749, issued to Tabet, describes a portable oil pump and tank which can be used to withdraw used lubricant and foreign matter from the crank case of an internal combustion engine through an opening in the engine such as the orifice through which the measuring stick is normally inserted. However, the apparatus as taught by Tabet does not disclose any means for supplying fresh oil to the engine. In addition, it does not provide a work surface to support the engine or any means for containing oil which is inadvertently spilled.

U.S. Pat. No. 5,016,689, issued to McGarvey et al., discloses a semi-mobile safety tank which is operable to receive and store a liquid hydrocarbon or the like and from which the liquid may be withdrawn. The apparatus as taught by McGarvey teaches a tank structure which includes an inner metallic tank and an outer metallic tank protectively receiving the inner tank. The outer tank provides protection from contaminant liquid leakage to the exterior of the inner tank. The tank structure includes a cover extending over the inner and outer tanks. The invention also includes a pump means having a liquid intake port and delivery port, the delivery port communicating with the interior of the inner tank. A valve has associated means for sensing the level liquid in the inner tank and for closing the valve in response to the rising of the liquid surface to a predetermined level. However, the tank taught by McGarvey is not readily movable and does not provide a suitable work surface for working on a sewing machine or the like.

Thus, there remains a need for a new and improved mobile oil change cart which is operable to both supply fresh oil to a sewing machine or the like and receive waste oil from the machine. In addition, the upper surface of the cart provides a work surface to support the sewing machine and includes a special sink for containing oil which may be inadvertently spilled during maintenance.

SUMMARY OF THE INVENTION

The present invention is directed to a mobile oil change cart having a generally rectangular parallelepiped shape whose upper surface defines a work surface for supporting a sewing machine or the like. The upper work surface includes a rubber mat on which the machine can be placed and which prevents the machine from sliding about. Adjacent to the rubber mat is a recessed sink for containing fluids which may be spilled from the sewing machine during maintenance. A rack across the surface of the sink supports the sewing machine while draining the oil from the machine. Wheels mounted to the lower surface of the cart permit it to be easily moved from one work station to another.

Underneath the work surface is a tank compartment for receiving and storing both fresh and waste oil. In addition, the tank compartment also includes pump means for both delivering fresh oil to the sewing machine and retrieving waste oil from the sewing machine. A second storage compartment located at the other end of the cart provides for storage of oil filters and the like for use during maintenance.

Accordingly, one aspect of the present invention is to provide a mobile oil change cart. The cart includes: (a) a generally rectangular parallelepiped body defining an upper work surface, a lower support surface and a plurality of side walls; (b) a plurality of wheels attached to the lower support surface; and (c) means for supplying fresh oil to and retrieving waste oil from a sewing machine or the like during maintenance of the machine.

Another aspect of the present invention is to provide an oil supply and waste oil retrieval apparatus for a mobile oil change cart. The apparatus includes: (a) a fresh oil reservoir; (b) a fill pump connected to the fresh oil reservoir; (c) a waste oil reservoir; (d) a drain pump connected to the waste oil reservoir; and (e) control means for selectively activating the fill pump or the drain pump during maintenance of the machine.

Still another aspect of the present invention is to provide a mobile oil change cart. The cart includes: (a) a generally rectangular parallelepiped body defining an upper work surface, a lower support surface and a plurality of side walls; (b) a plurality of wheels attached to the lower support surface; (c) means for supplying fresh oil to and retrieving waste oil from a sewing machine or the like during maintenance of the machine, the means including: (i) a fresh oil reservoir; (ii) a fill pump connected to the fresh oil reservoir; (iii) a waste oil reservoir; (iv) a drain pump connected to the waste oil reservoir; and (v) control means for selectively activating the fill pump or the drain pump during maintenance of the machine; and (d) a recessed sink located in the upper work surface for containing oil which may be spilled during the maintenance of the machine.

These and other aspects of the present invention will become apparent to those skilled in the art after a reading of the following description of the preferred embodiment when considered with the drawings.

DESCRIPTION OF THE PREFERRED EMBODIMENTS

Figure 1:
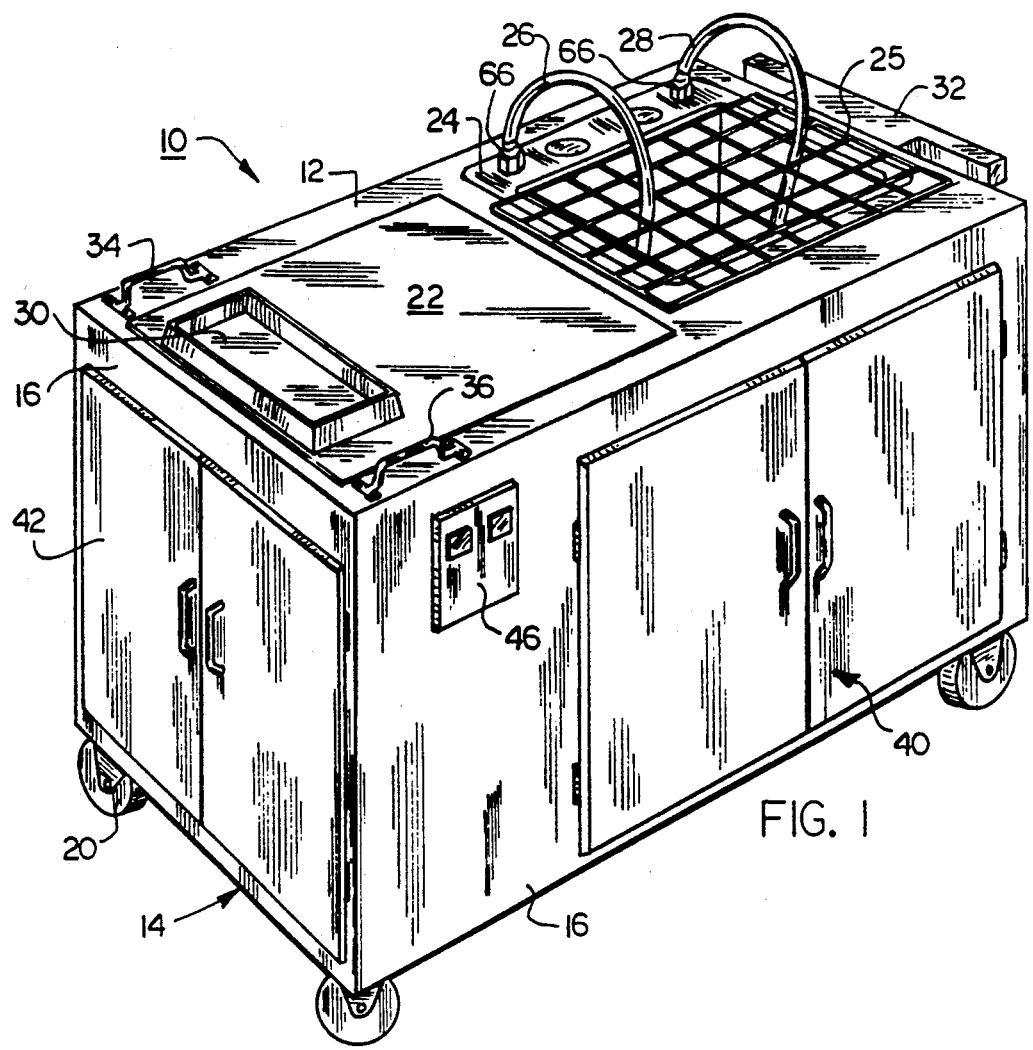
FIG. 1 is a rear perspective view illustrating an oil change cart constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an oil change cart, generally designated 10, is shown constructed according to the present invention. The oil change cart 10 is a generally rectangular parallelepiped forming an upper work surface 12, a lower support surface 14, and a plurality of side walls 16. Wheels 20 mounted on the lower support surface 14 permit the cart to be moved easily from one work station to another.

The upper work surface 12 includes a rubber mat 22 for supporting a sewing machine or the like and a recessed sink 24 having a rack 25 covering the upper surface. Flexible plastic tubing 26,28 extend from the sink 24 and supply oil to and from a sewing machine or the like.

A tool tray 30 mounted on the upper support surface holds tools and small parts from the machine during servicing. Front handle 32 permits the oil change cart 10 to be moved easily from one work station to another. Rear handles 34,36 mounted to the upper surface 12 also permit the oil change cart 10 to be moved easily.

Oil change cart 10 also includes a tank compartment 40 and a storage compartment 42 which will be discussed in more detail later. A control panel 46 mounted on one side wall operates the pumps which provide oil to and retrieve oil from the sewing machine.

Figure 2:
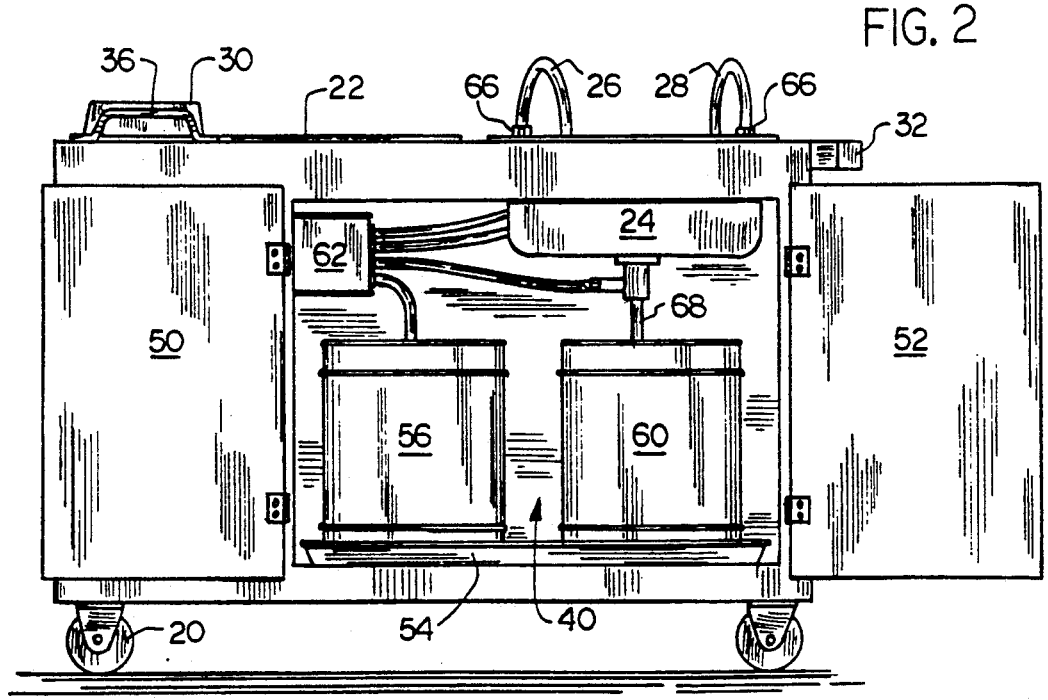
FIG. 2 is a side elevational view of the cart shown in FIG. 1 with the side doors open to illustrate the tank compartment.

Turning now to FIG. 2, it can be seen that tank compartment 40 includes a pair of hinged side doors 50,52. Tank compartment 40 also includes a rubber mat 54 for supporting the fresh oil supply tank 56 and waste oil tank 60. Pump means, generally designated 62, is attached to one wall of the compartment 40. In the preferred embodiment, pump means 62 includes a fill pump 76 and a drain pump 86. Flexible plastic tubing conducts oil to and from the sewing machine and the tanks as will be discussed in more detail later. Strain relief bushings 66 permit the flexible plastic tubing to be withdrawn and secured in position as required. A drain 68 connects sink 24 to waste oil tank 60.

Figure 3:
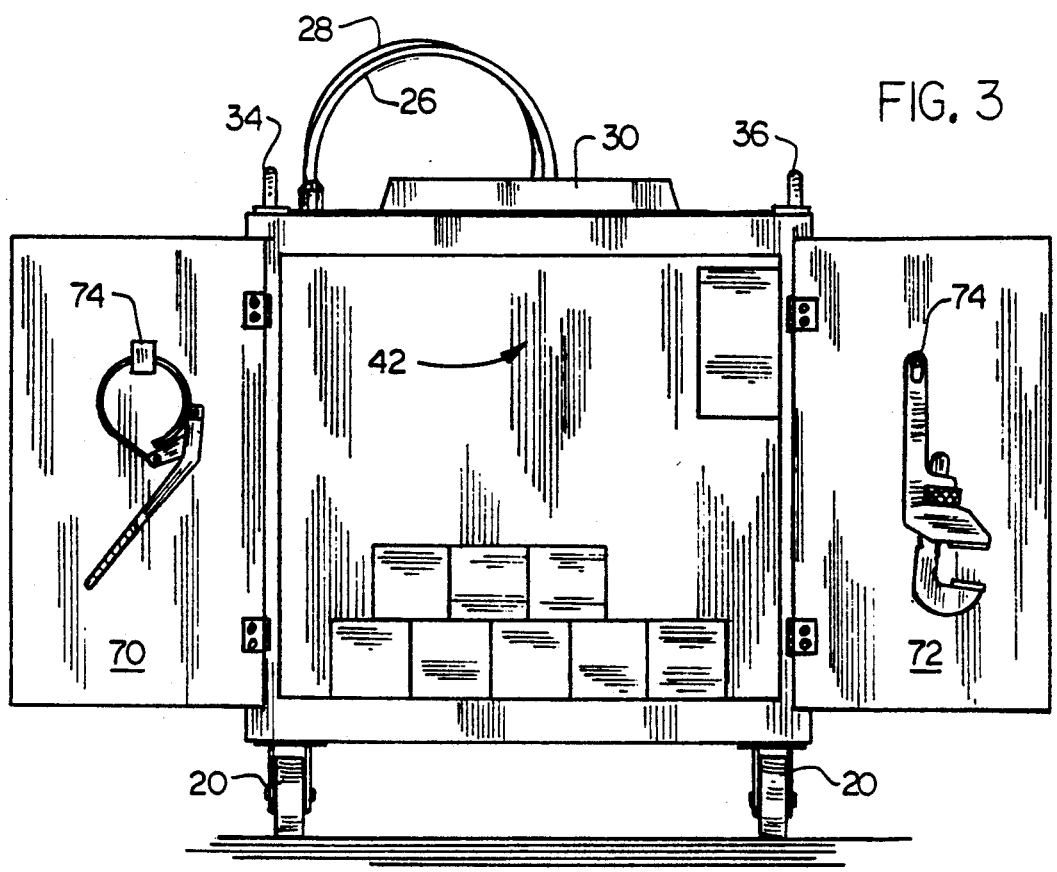
FIG. 3 is a rear elevational view of the cart shown in FIG. 1 with the rear doors open to illustrate the storage compartment.

As best seen in FIG. 3, storage compartment 42 includes a pair of hinged rear doors 70,72. Each door may include one or more brackets 74 for hanging various tools and wrenches needed for the maintenance operations.

Figure 4:
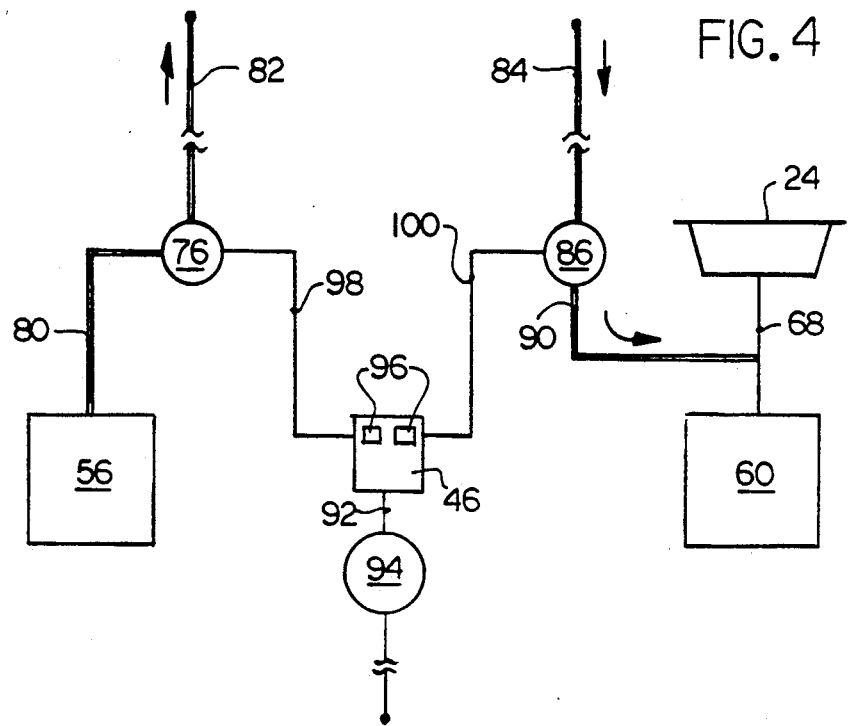
FIG. 4 is a block diagram illustrating the pump and control system utilized in the present invention.

Finally, FIG. 4 shows a block diagram illustrating the pump and control system utilized in the present invention. Fill pump 76 is connected to oil supply tank 56 by fill inlet tubing 80. Fill outlet tubing 82 extends through releasible stain relief bushing 66 and sink 24 to reach the sewing machine (not shown). Drain inlet tubing 84 is connected to drain pump 86. Fill and drain pumps 76,86 can be conventional AC powered sewing machine oil circulating pumps. Drain outlet tubing 90 is connected to Tee-drain 68 which is connected between sinks 24 and waste oil tank 60.

Power line 92 is connected to an automatic retracting reel 94 which may be plugged into a conventional power supply such as a 208 AC line (not shown). Switches 96 located in control panel 46 selectively supply power to pump 76,86 along lines 98,100.

In operation, oil change cart 10 is moved adjacent to a sewing machine which is due for maintenance. Retracting reel 94 is extended and plugged into a conventional power supply such as a 208 AC line (not shown). Flexible plastic tubing 28 is extended from the sink 24 and connected to the drain of the sewing machine. Strain relief bushings 66 permit the flexible plastic tubing to be withdrawn and secured in position as required. Control panel 46 mounted on one side wall is actuated to operate drain pump 86 which retrieves oil from the sewing machine and into waste oil tank 60. The machine may then be moved over sink 24 to remove the oil filter and allow the remaining waste oil to flow down drain 68 into waste oil tank 60. A new filter is placed on the machine and flexible plastic tubing 26 is extended from the sink 24 and connected to the fill port of the sewing machine. Control panel 46 is actuated to operate fill pump 76 which supplies fresh oil to the sewing machine from fresh oil tank 56. The machine is then returned to service and the cart is moved to the next machine scheduled for maintenance.

Certain modifications and improvements will occur to those skilled in the art upon a reading of the foregoing description. By way of example, a flow restrictor could be added in the drain to prevent spills due to too much flow into the waste tank. Also, a spill tray could be placed under tanks 56,60 to contain accidental spills. It should be understood that all such modifications and improvements have been deleted herein for the sake of conciseness and readability but are properly within the scope of the following claims.

We claim:

1. A mobile oil change cart for a sewing machine, said cart comprising:
   (a) a generally rectangular parallelepiped body defining an upper work surface, a lower support surface and a plurality of side walls;
   (b) a plurality of wheels attached to said lower support surface;
   (c) means for supplying fresh oil to and retrieving waste oil from the machine during maintenance of the machine, said means including: (i) a fresh oil reservoir; (ii) a fill pump connected to said fresh oil reservoir; (iii) a waste oil reservoir; (iv) a drain pump connected to said waste oil reservoir; and (v) control means for selectively activating said fill pump or said drain pump during maintenance of the machine, said means further including a first length of retractable, flexible plastic tubing connected to the outlet of said fill pump for supplying fresh oil to the machine and a second length of retractable, flexible plastic tubing connected to the inlet of said drain pump for retrieving waste oil from the machine; and
   (d) a recessed sink located in said upper work surface for containing oil which may be spilled during the maintenance of the machine, wherein said sink includes a rack located across the upper surface of said sink for supporting the machine and preventing small parts from the machine from falling into said sink during the maintenance of the machine.

2. The apparatus according to claim 1, wherein said sink includes a drain connected between said drain pump and said waste oil reservoir.

3. The apparatus according to claim 1, wherein said upper work surface includes a rubber mat for preventing the sewing machine from sliding during maintenance of the machine.

4. The apparatus according to claim 1, wherein said upper work surface includes a tool tray for receiving tools used during maintenance of the machine.

5. The apparatus according to claim 1, further including a handle attached to one end of said cart for permitting said cart to be moved from one work station to another.

6. The apparatus according to claim 5, further including at least one additional handle attached to said upper work surface of said cart for permitting said cart to be moved from one work station to another.

7. The apparatus according to claim 1, wherein said wheels include a pair of fixed wheels located at one end of said lower support surface and at least one swivel wheel located at the opposite end of said lower support surface.

8. The apparatus according to claim 1, wherein said one of said side walls includes a first doorway defining a first compartment for housing said means for supplying fresh oil to and retrieving waste oil from the machine.

9. The apparatus according to claim 8, wherein said first doorway defining a first compartment for housing said means for supplying fresh oil to and retrieving waste oil from the machine includes a pair of hinged doors for permitting access to said first compartment.

10. The apparatus according to claim 8, wherein said one of said side walls includes a second doorway defining a second compartment for storage.

11. The apparatus according to claim 10, wherein said second doorway defining a second compartment for storage includes a pair of hinged doors for permitting access to said second compartment.

12. The apparatus according to claim 1, wherein said control means includes a retractable power cord for supplying power to said fill pump and said drain pump.

* * * * *